US006389386B1

(12) United States Patent
Hetherington et al.

(10) Patent No.: US 6,389,386 B1
(45) Date of Patent: May 14, 2002

(54) METHOD, SYSTEM AND COMPUTER PROGRAM PRODUCT FOR SORTING TEXT STRINGS

(75) Inventors: David James Hetherington, Austin, TX (US); David Bruce Kumhyr, Fuguay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,808

(22) Filed: Dec. 15, 1998

(51) Int. Cl.[7] .............................................. G06F 17/20
(52) U.S. Cl. ................................ 704/8; 707/7; 707/535
(58) Field of Search .............................. 704/1, 8, 9, 10; 707/7.101, 530, 531, 535, 536; 345/467

(56) References Cited

U.S. PATENT DOCUMENTS

| 4,379,288 A | 4/1983 | Leung et al. |
| 4,384,329 A | 5/1983 | Rosenbaum et al. ........ 364/300 |
| 4,544,276 A | 10/1985 | Horodeck |
| 4,611,280 A | * 9/1986 | Linderman ..................... 707/7 |
| 4,641,264 A | 2/1987 | Nitta et al. |
| 4,706,212 A | 11/1987 | Toma |
| 4,730,270 A | 3/1988 | Okajima et al. ............ 364/900 |
| 4,737,040 A | 4/1988 | Moon |
| 4,951,202 A | 8/1990 | Yan |
| 4,954,984 A | 9/1990 | Kaijima et al. |
| 4,962,452 A | 10/1990 | Nogami et al. |
| 5,040,218 A | 8/1991 | Vitale et al. |
| 5,056,021 A | 10/1991 | Ausborn |

(List continued on next page.)

FOREIGN PATENT DOCUMENTS

| JP | 57-199070 | 12/1982 |
| JP | 5-224687 | 9/1993 |
| JP | 7-261652 | 10/1995 |
| JP | 9-62679 | 3/1997 |
| JP | 9-237270 | 9/1997 |
| JP | 271793 | 10/2000 |
| WO | WO 97/404 | 10/1997 ........... G06F/17/28 |

OTHER PUBLICATIONS

Method for Allowing Translation of Operator Input Comparison Strings in an Online Presentation Program, Jan. 1986, IBM Technical Disclosure Bulletin, vol. 28, No. 8, pp. 3682–3683.
Architecture for Speech Synthesis from Text Recognition Methods, Apr. 1994, IBM Technical Disclosure Bulletin, vol. 37, No. 04A, pp. 287–289.
Bridging Speech Recognition and Natural Language Processing Subsystems, Jan. 1996, IBM Technical Disclosure Bulletin, vol. 39, No. 01, pp. 229–231.

(List continued on next page.)

Primary Examiner—Patrick N. Edouard
(74) Attorney, Agent, or Firm—Jeffrey S. LaBaw; Bracewell & Patterson, L.L.P.

(57) ABSTRACT

A multi-field text string contains display characters in a first field and sort characters in a second field. For ideographic languages such as Japanese, the display characters may be Kanji symbols for the text string while the sort characters are phonetic syllabary representations of the Kanji symbols. A plurality of such multi-field text strings may then be sorted by the contents of the second field rather than the contents of the first. Despite both the multiple pronunciations or meanings associated with the same Kanji symbols in Japanese and the unsorted ordering of Kanji symbols within the Unicode character set for Japanese, a culturally correct sort order is achieved for the multi-field text strings. Additionally, the contents of the second field may be altered to artificially promote a specific item within the sort order, while displaying the sorted text strings utilizing the contents of the first field. The mechanism for promoting particular text strings within the sort order does not interfere with user viewing of the displayed text strings.

24 Claims, 3 Drawing Sheets

U.S. PATENT DOCUMENTS

| | | | | |
|---|---|---|---|---|
| 5,091,878 | A | 2/1992 | Nagasawa et al. | |
| 5,109,352 | A | 4/1992 | O'Dell | |
| 5,136,503 | A | 8/1992 | Takagi et al. | |
| 5,164,900 | A | 11/1992 | Bernath | 364/419 |
| 5,175,803 | A | 12/1992 | Yeh | |
| 5,214,583 | A | 5/1993 | Miike et al. | 364/419 |
| 5,243,519 | A | 9/1993 | Andrews et al. | 364/419.05 |
| 5,251,130 | A | 10/1993 | Andrews et al. | 364/419.03 |
| 5,268,990 | A | 12/1993 | Cohen et al. | 395/2 |
| 5,307,267 | A | 4/1994 | Yang | |
| 5,371,844 | A | 12/1994 | Andrew et al. | |
| 5,377,317 | A | 12/1994 | Bates et al. | |
| 5,384,700 | A | 1/1995 | Lim et al. | |
| 5,390,295 | A | 2/1995 | Bates et al. | |
| 5,416,903 | A | 5/1995 | Malcolm | |
| 5,418,718 | A | 5/1995 | Lim et al. | 364/419.16 |
| 5,420,976 | A | 5/1995 | Schell et al. | |
| 5,426,583 | A | 6/1995 | Uribe-Echebarria Diaz De Mendibil | 364/419.08 |
| 5,432,948 | A | 7/1995 | Davis et al. | |
| 5,434,777 | A | 7/1995 | Luciw | |
| 5,440,482 | A | 8/1995 | Davis | 364/419.13 |
| 5,448,474 | A | 9/1995 | Zamora | |
| 5,485,373 | A | 1/1996 | Davis et al. | 364/419.13 |
| 5,490,061 | A | 2/1996 | Tolin et al. | |
| 5,523,946 | A | 6/1996 | Kaplan et al. | |
| 5,546,575 | A | 8/1996 | Potter et al. | |
| 5,550,965 | A | 8/1996 | Gabbe et al. | |
| 5,594,642 | A | 1/1997 | Collins et al. | 395/797 |
| 5,600,779 | A | 2/1997 | Palmer et al. | |
| 5,640,581 | A | 6/1997 | Saraki | |
| 5,640,587 | A | 6/1997 | Davis et al. | |
| 5,642,490 | A | 6/1997 | Morgan et al. | |
| 5,644,775 | A | 7/1997 | Thompson et al. | 395/757 |
| 5,649,223 | A | 7/1997 | Freeman | |
| 5,675,818 | A | 10/1997 | Kennedy | 395/758 |
| 5,677,835 | A | 10/1997 | Carbonell et al. | 364/419.02 |
| 5,678,039 | A | 10/1997 | Hinks et al. | |
| 5,682,158 | A | 10/1997 | Edberg et al. | |
| 5,721,825 | A | 2/1998 | Lawson et al. | |
| 5,724,593 | A | 3/1998 | Hargrave, III et al. | |
| 5,734,887 | A | 3/1998 | Kingberg et al. | |
| 5,758,295 | A | 5/1998 | Ahlberg et al. | |
| 5,758,314 | A | 5/1998 | McKenna | |
| 5,778,356 | A | * 7/1998 | Heiny | 707/2 |
| 5,784,069 | A | 7/1998 | Daniels et al. | |
| 5,784,071 | A | 7/1998 | Tang et al. | |
| 5,787,452 | A | 7/1998 | McKenna | |
| 5,799,303 | A | * 8/1998 | Tsuchimura | 707/7 |
| 5,812,964 | A | 9/1998 | Finger | |
| 5,815,148 | A | 9/1998 | Tanaka | |
| 5,832,478 | A | 11/1998 | George | |
| 5,844,798 | A | 12/1998 | Uramoto | |
| 5,870,084 | A | 2/1999 | Kanungo et al. | |
| 5,872,973 | A | 2/1999 | Mitchell et al. | |
| 5,873,111 | A | * 2/1999 | Edberg | 707/536 |
| 5,917,484 | A | 6/1999 | Mullaney | |
| 5,966,637 | A | 10/1999 | Kanungo et al. | |
| 5,974,372 | A | 10/1999 | Barnes et al. | |
| 6,003,049 | A | * 12/1999 | Chiang | 707/535 |
| 6,024,571 | A | 2/2000 | Renegar | |
| 6,028,600 | A | 2/2000 | Rosin et al. | |
| 6,144,377 | A | 11/2000 | Oppermann et al. | |
| 6,167,366 | A | 12/2000 | Johnson | |
| 6,205,418 | B1 | 3/2001 | Li et al. | |

OTHER PUBLICATIONS

U.S. application No. 09/211,809, Hetherington et al., filed Dec. 15, 1998.
U.S. application No. 09/211,803, Hetherington et al., filed Dec. 15, 1998.
U.S. application No. 09/211,799, Hetherington et al., filed Dec. 15, 1998.
U.S. application No. 09/211,802, Hetherington et al., filed Dec. 15, 1998.
U.S. application No. 09/211,813, Hetherington et al., filed Dec. 15, 1998.
U.S. application No. 09/211,801, Hetherington et al., filed Dec. 15, 1998.
U.S. application No. 09/211,812, Hetherington et al., filed Dec. 15, 1998.
New Icons, Oct. 1996, IBM Technical Disclosure Bulletin, vol. 39, No. 10, pp. 25–27.
Intelligent Computer Keyboard for Entering Texts of Sinhalese and Other Similar Languages, Nov. 1992, IBM Technical Disclosure Bulletin, vol. 35, No. 6, pp. 24–27.
Enhanced Methods for Spelling Names in Speech Recognition Systems, Nov. 1995, IBM Technical Disclosure Bulletin, vol. 38, No. 11, pp. 45–46.
IBM Technical Disclosure Bulletin, Preprocess for Text Formatting, Jan. 1990, vol. 32 No. 8A, pp. 280–282.
IBM Technical Disclosure Bulletin, Extending Presentation Manager Container Sort Capabilities, May 1995, vol. 38, No. 05, pp. 353–354.

* cited by examiner

*Prior Art*

*Prior Art*

METHOD, SYSTEM AND COMPUTER PROGRAM PRODUCT FOR SORTING TEXT STRINGS

RELATED APPLICATIONS

The present invention is related to the subject matter of the following commonly assigned, copending U.S. patent applications Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Dec. 15, 1998; Ser. No. 09/211,809 entitled "METHOD, SYSTEM AND COMPUTER PROGRAM PRODUCT FOR CAPTURING LANGUAGE TRANSLATION AND SORTING INFORMATION INTO A TEXT STRING CLASS" and filed Dec. 15, 1998; Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No. 09/211,799 entitled "METHOD, SYSTEM AND COMPUTER PROGRAM PRODUCT FOR ROTATING THROUGH A SEQUENCE OF DISPLAY STATES IN A MULTI-FIELD TEXT CLASS IN A GRAPHICAL USER INTERFACE" and filed Dec. 15, 1998; Ser. No. 09/211,802 entitled "METHOD, SYSTEM AND COMPUTER PROGRAM PRODUCT FOR CONTROLLING THE GRAPHICAL DISPLAY OF MULTI-FIELD TEXT STRING OBJECTS" and filed Dec. 15, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; Ser. No. 09/211,802 entitled "METHOD, SYSTEM AND COMPUTER PROGRAM PRODUCT FOR DYNAMIC LANGUAGE SWITCHING IN A MULTI-FIELD TEXT STRING OBJECT VIA MESSAGING" and filed Dec. 15, 1998; and Ser. No. 09/211,812 entitled "METHOD, SYSTEM AND COMPUTER PROGRAM PRODUCT FOR AUTOMATIC CHARACTER TRANSLITERATION IN A TEXT STRING OBJECT" and filed Dec. 15, 1998. The content of the above-referenced applications is incorporated herein by reference.

BACKGROUND OF THE INVENTION

1. Technical Field

The present invention relates in general to sorting text strings and in particular to sorting text strings in a culturally correct order where the text string language does not provide pronunciation information and/or data processing system character codes are unsorted for the text string language. Still more particularly, the present invention relates to sorting text strings based on either pronunciation or user-defined sort orders artificially promoting selected text strings while displaying pronunciation- or sort order-independent representations of the text strings.

2. Description of the Related Art

Multinational companies often run information system (IS) networks which span multiple locales spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

For offices located in Japan, objects would be named in Japanese. However, Japanese is a logosyllabic or ideographic language which does not have an alphabet representing simple sounds, but instead has a very large character set with symbols ("ideographs") corresponding to concepts and objects rather than simple sounds. For instance, the Joyo Kanji List (Kanji for Daily Use) adopted for the Japanese language in 1981 includes 1945 symbols.

Figure 4A:
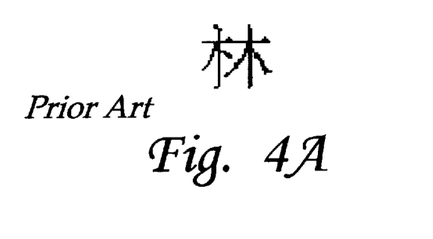
FIGS. 4A–4B are ideographs having identical pronunciations.
Figure 4B:
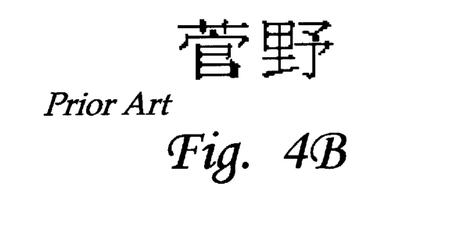

In Japanese, the same ideograph may have multiple meanings and/or pronunciations. For instance, the symbol depicted in FIG. 4A may be pronounced either "hayashi" or "rin" (or "lin"); and the characters depicted in FIG. 4B may be pronounced "suga no," "suga ya," "kan no," or "kan ya." This circumstance is based in part on the history of the Japanese language, in which the Kanji characters were adopted from the Chinese language. Thus, for example, the "rin" symbol depicted in FIG. 4A is On-Yomi, basically a simulation of the Chinese pronunciation when the character was imported to Japan, while "hayashill" is Kun-Yomi, a Japanese word assigned to the character which has the same meaning.

A culturally correct sort order for names represented by identical ideographs might be based on pronunciation. However, ideographs or data processing system codes (e.g., Unicode codes) representing ideographs generally provide no information as to the correct pronunciation. Sorting a plurality of abstract objects by name, therefore, may result in an incorrect sort order being displayed.

An additional and independent complication arises in sorting abstract objects by name from the fact that the same Kanji character set is largely shared by the Chinese, Japanese and other Asian languages. The UNICODE Han unification has reordered the Kanji characters for Chinese, unsorting them for Japanese, as well as for Vietnamese and Korean.

Yet another independent sorting problem is that frequently a need arises to alter the collation sequence of a list or to create a second-order list. For instance, it may be desirable to sort a list of users alphabetically within each hierarchical level of an enterprise. That is, the user list is to be sorted with the enterprise's principal officer first, followed by other officers sorted alphabetically and then by staff members sorted alphabetically. Currently names are "floated" to the top of a sorted list by inserting an extraneous character with a low sort value at the front of the string (e.g., "_Frank Moss"). However, the extraneous characters will normally be displayed in the sorted list.

It would be desirable, therefore, to provide a mechanism for sorting Japanese text strings in a culturally correct order. It would further be advantageous if the mechanism could be employed to sort Kanji character strings in a culturally correct order despite the sorting order employed by character sets. It would also be advantageous to sort text strings in a user-defined sort order with selected strings artificially promoted without displaying the mechanism by which the selected text strings are promoted.

SUMMARY OF THE INVENTION

It is therefore one object of the present invention to provide an improved method, system and computer program product for sorting text strings.

It is another object of the present invention to provide a method, system and computer program product for sorting text strings in a culturally correct order where the text string language does not provide pronunciation information and/or data processing system character codes are unsorted for the text string language.

It is yet another object of the present invention to provide a method, system and computer program product for sorting text strings based on either pronunciation or user-defined sort orders artificially promoting selected text strings while displaying representations of the text strings which are independent of pronunciation or artificial sort order mechanisms.

The foregoing objects are achieved as is now described. A multi-field text string contains display characters in a first field and sort characters in a second field. For ideographic languages such as Japanese, the display characters may be Kanji symbols for the text string while the sort characters are phonetic syllabary representations of the Kanji symbols. A plurality of such multi-field text strings may then be sorted by the contents of the second field rather than the contents of the first. Despite both the multiple pronunciations or meanings associated with the same Kanji symbols in Japanese and the unsorted ordering of Kanji symbols within the character set for Japanese, a culturally correct sort order is achieved for the multi-field text strings. Additionally, the contents of the second field may be altered to artificially promote a specific item within the sort order, while displaying the sorted text strings utilizing the contents of the first field. The mechanism for promoting particular text strings within the sort order does not interfere with user viewing of the displayed text strings.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
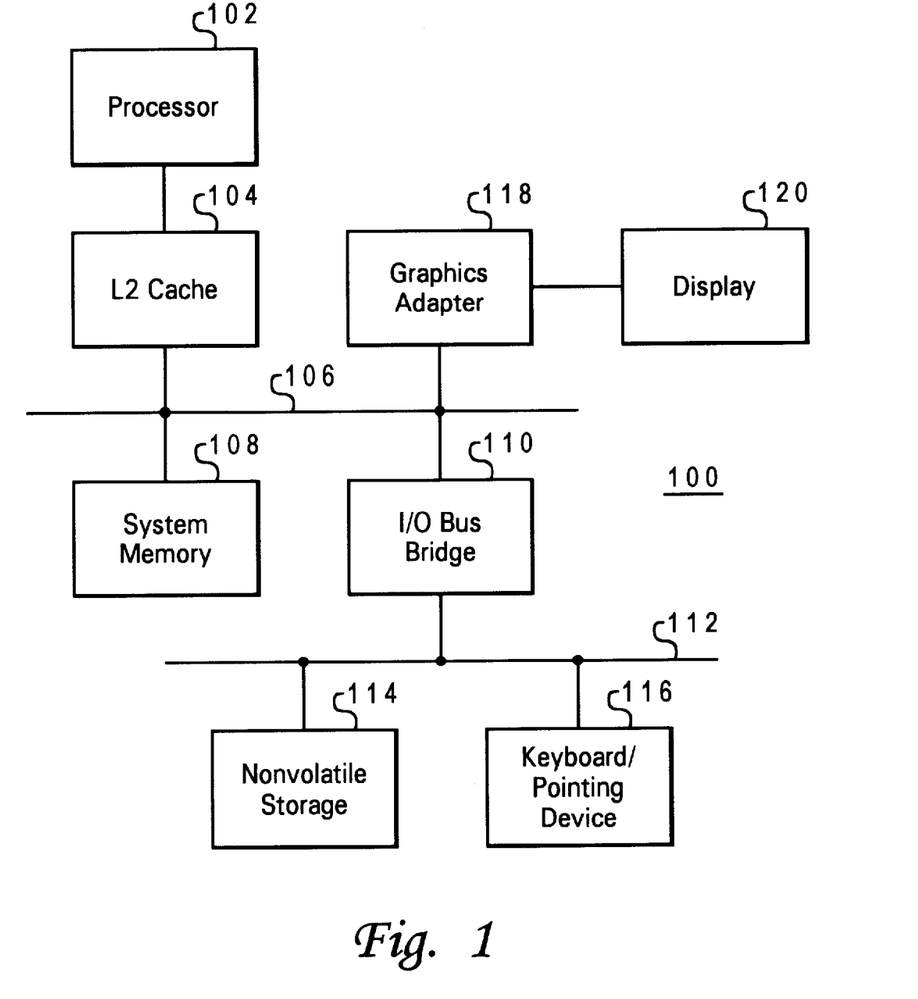
FIG. 1 depicts a diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® available from International Business Machines Corporation of Armonk, New York. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
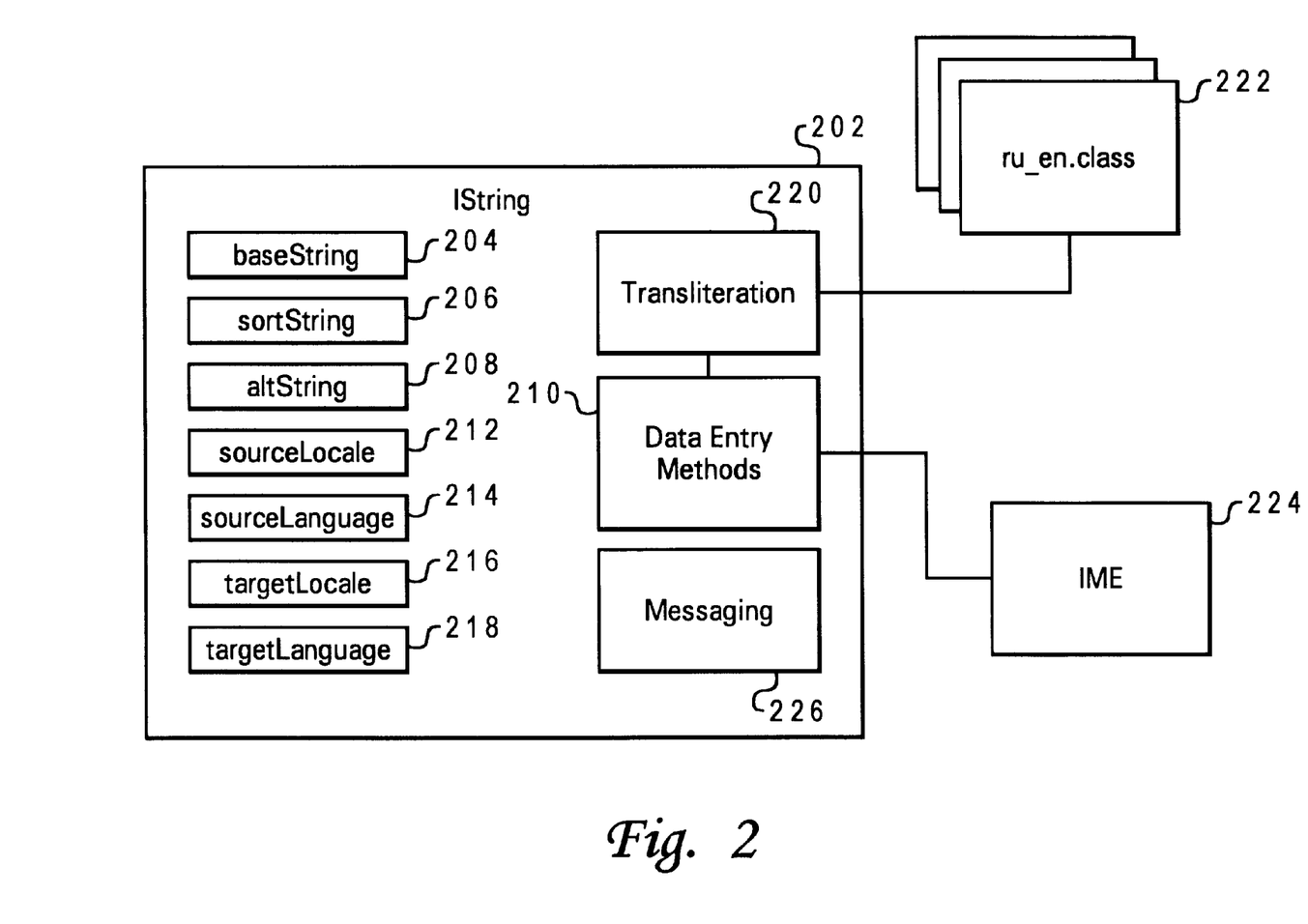
FIG. 2 is a diagram of a multi-field text string class employed in sorting text strings in accordance with a preferred embodiment of the present invention.

Referring to FIG. 2, a diagram of a multi-field text string class employed in sorting text strings in accordance with a preferred embodiment of the present invention is depicted. A fundamental problem in multinational computing environments which need to display data in multiple human languages is that a spoken word generally encapsulates information in multiple aspects or attributes, such as through the word's meaning, from context, and/or from inflection. When reduced to a visual or electronic representation for manipulation or display in a data processing system, the word may lose some attributes and much of the associated meaning. Most importantly for data processing systems, a visual representation of a word may give no clues as to the correct translation or pronunciation of the word or the proper placement of a word within a specified sort order. International String ("IString") class 202 may be employed to address this problem.

IString class 202 is preferably a Java class similar to the Java String class, which behaves like the String class by including similar methods. Most of the original behavior of the String class should be preserved, with additional functionality added and utilized only as needed. IString class 202 is a datatype which captures some of the meaning of spoken words which is normally lost when the word is reduced to a visual representation. IString class 202 is preferably utilized for all object names and system messages within a system.

The IString class 202 structure includes three different strings for each name, message, data, or text object: a baseString 204, a sortString 206, and an altString 208. BaseString 204 is the string within IString class 202 employed by default in the user interface display and may contain any text, usually the original text entered by the user in the local language where the IString object is created. SortString 206 may also be any text and is employed to allow correct sorting of non-phonetic languages and languages which are difficult to sort based only on the binary value of baseString 204. AltString 208 may be any text but should conventionally be filled with a latin character set representation of the pronunciation of the data contained in baseString 204. Thus, IString class 202 includes the original text (baseString 204), a sort key (sortString 206), and a pronunciation key (altString 208) for object names, system messages, and other data.

When implemented in Java, a constructor for an IString class 202 object may be composed of the following fields:

```
/** The base text String */
protected String baseString;
/** The related text String for proper collation */
protected String sortString;
/** The related alternate text String (pronunciation key) */
protected String altString;
/** The source locale, as an ISO-3166 code; used for
    collation */
protected String sourceLocale;
/** The source language, as an ISO-639 code */
protected String sourceLanguage;
/** The source variant defined for EBCIDIC and case
    mapping */
protected String sourceVariant;
/** The target locale, as an ISO-3166 code */
protected String targetLocale;
/** The target language, as an ISO-639 code */
protected String targetLanguage;
/** The target variant defined for EBCIDIC and case
    mapping */
protected String targetvariant;
```

Complete listings of the upper-case, two letter ISO Country Codes defined by ISO-3166 and the lower-case, two letter ISO Language Codes defined by ISO-639 are readily available from a variety of sources on the Internet Table I illustrates how data within the IString data type 202 looks when represented as a table:

TABLE I

| Field | Type | Data |
|---|---|---|
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| sourceVariant | Java String | Variant code |
| targetLocale | Java String | ISO-3166 code, example "JP" |
| targetLanguage | Java String | ISO-639 code, example "ja" |
| targetVariant | Java String | Variant code |

A Java constructor for a new, empty IString class object 202 where the contents are independent of language or locale may be:

```
/***********************************
 ******
 *
 * <P> </P>
 *
 * <dt> <b> Description: </b> <dd>
 * <p>Allocate a new IString containing no characters
   in the default
 * locale. </p>
 *
 ***********************************
 *******
 public IString( ) {
    this.baseString=new String( );
    this.sortString=new String( );
    this.altString=new String( );
    init( );
 }
```

To allow objects of the IString class 202 datatype to be stored in an Object Database (ODB), however, and to permit manipulation of IString data by Common Object Request Broker Architecture (CORBA) applications, an Interface Definition Language (IDL) class should be defined:

```
struct IString{
string baseString;      //base test String
string sortString;      //related text String for collation
string altString;       //related alternate text String (pronunciation)
string sourceLocale;    //source locale as an ISO-3166 code
string sourceLanguage;  //source language as an ISO-639 code
string sourceVariant;   //source variant code
string targetLocale;    //target locale as an ISO-3166 code
string targetLanguage;  //target language as an ISO-639 code
string targetVariant;   //target variant code
}
```

The contents of baseString 204, sortString 206, and altString 208 are preferably but not necessarily Unicode text entered by data entry methods 210 within IString class 202. Data entry methods 210, and thus the contents of baseString 204, sortString 206, and altString 208, may depend at least in part on language and locale parameters defined by sourceLocale field 212, sourceLanguage field 214, targetLocale field 216, and targetLanguage field 218.

Because data entry methods 210 are dependent on the locale and/or langauge employed by the underlying host system, creation of a new IString object 202 preferably results in the locale and language properties of the host system in which the IString object 202 is created being placed in sourceLocale field 212 and sourceLanguage field 214. A constructor for allocating a new, empty IString for a specified locale and language determined from the host system in which the IString class object 202 is being created may be:

```
/***********************************
 ******
 *
 * <P> </P>
 *
 * <dt> <b> Description: </b> <dd>
 * <p>Allocate a new IString containing no characters
   in the
 * specified locale. </p>
 *
 ***********************************
 *******
 public IString(Locale loc) {
    this.baseString=new String( );
    this.sortString=new String( );
    this.altString=new String( );
    this.sourceLocale=ioc.getLocale( );
    this.sourceLanguage=loc.getLanguage( );
    init( );
 }
```

Input of data into an IString class 202 object is preferably locale- or language-dependent. The source-Language and targetLanguage properties 214 and 218 control how data is input into an IString class object 202 by data input methods 210. The sourceLanguage property 214 may be set to the language property of the host system on which the IString class object is created. The targetLanguage property 218 may also be set to that language, or may alternatively be set to a common, "universal", language such as English. Data input methods 210 compare sourceLanguage and targetLanguage properties 214 and 218 to determine what is entered into baseString 204, sortString 206, and altString 208 in an IString class object 202.

Character strings are entered into the baseString 204, sortString 206, and altString 208 fields by data input methods 220 for IString class 202, which may selectively utilize data from either the user's direct entry or specification, from transliteration engine 220, or from the Input Method Editor (IME) 224. Where the targetLanguage property 218 is set to English as a default, data entry methods 210 determine the contents of baseString 204, sortString 206, and altString 208 fields based upon the character set employed by the language in which data is entered by the user (sourceLanguage property 214).

For languages which employ the latin character set, the user input is placed by data entry methods 220 into all three fields (baseString 204, sortString 206, and altString 208) of the IString class 202 by data entry methods 210. A suitable constructor may be:

```
/***********************************************
 ******
 *
 * <P> </P>
 *
 * <dt> <b> Description: </b> <dd>
 * <p>Allocate a new IString which contains the same
   sequence of
 * characters as the string argument in the specified
   locale. </p>
 *
 ***********************************************
 *******
  public IString(String str, Locale loc) {
     this.baseString new String(str);
     this.sortString=new String(str);
     this.altString=new String(str);
     this.sourceLocale=loc.getLocale( );
     this.sourceLanguage=loc.getLanguage( );
     init( );
  }
```

For most locales and languages, the entered string will be input into all three fields of the IString object 202. If targetLanguage property 218 were not set to English, data entry methods 224 would input the user-entered text into all three fields whenever the languages identified in source-Language and targetLanguage properties 214 and 218 employ a common character set (e.g., both employ latin characters, as in the case of Spanish and Afrikaans).

Table II illustrates how data is entered into IString class 202 fields where the host language and locale utilize the latin character set.

TABLE II

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA__Hetherington") into sortString 206.

For languages which do not employ the latin character set, but which utilize a character set which may be sound mapped to the latin character set, the user input is entered by data entry methods 210 into baseString 204 and sortString 206, but a transliterated, phonetic representation of the input is placed in altString 208. An internal method within the transliteration engine 220 is employed to sound-map the passed string to a phonetic, latin character representation for altString 208 to transliterate entered characters into other characters understandable to people who are not familiar with the character set of the original language.

To generate the contents of altString 208, transliteration engine 220 selects an appropriate Java resource file 222 containing a mapping table to create the alternate text to be placed in altString 208. The selection of the particular resource file which is employed based on the combination of source and target languages. Java resource files 222 are named for the combination of languages for which the mapping is being performed. In the example shown in FIG. 2, ru—en__class is for mapping Russian (Cyrillic characters) to English (Latin characters). The structure of resource file 222 is a table with associated entries for foreign language characters and corresponding latin characters.

A suitable constructor for an IString object in which altString 208 is transliterated from the passed string may be:

```
/***********************************************
 ******
 *
 * <P> </P>
 *
 * <dt> <b> Description: </b> <dd>
 * <p>Allocate a new IString. The baseString and
   sortString are the
 * passed string, the altString is transliterated into the
   target
 * language. </p>
 *
 ***********************************************
 *******
  public IString(String str) {
     this.baseString=new String(str);
     this.sortString=new String(str);
     if(isSameLanguage( )
        this.altString=new String(str);
     else
        this.altString=transmogrify(str,
           this.sourceLanguage,
           this.targetLanguage);
  }
```

The "transmogrify" method is the internal method within transliteration engine 220 which was described above. The character set into which the entered characters are transliterated is determined from the targetLanguage property 218, which in the exemplary embodiment is assumed to be set to English. Given an appropriate resource file 222, however, characters may be transliterated between any two languages for which characters in one language sound-map to one or more characters in the other.

Table III illustrates how data is entered into IString class 202 by data entry methods 210 where the language utilizes a non-latin character set which maps to the latin character set, such as Russian Cyrillic.

TABLE III

| Field | Type | Data |
|---|---|---|
| baseString | Java String | Давид Кумгир |
| sortString | Java String | Давид Кумгир |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString 204 and sortString 206, but the text entered into altString 208 is selected by transliteration engine 220 utilizing a resource table of Russian Cyrillic to English character sound mappings. The phonetic representation of the baseString 204 is thus entered into altString 208 as a pronunciation key for users unfamiliar with the Cyrillic character set.

For languages which do not employ the latin character set or a character set which may be sound-mapped to the latin character set, data entry methods 210 input data into the baseString 204, sortString 206, and altString 208 fields which is derived from the input method editor (IME) 224. IME 224 may be either a customized input method editor or the input method editor which is integrated into Asian versions of the Windows NT operating system available from Microsoft Corporation of Redmond Washington. If the Windows NT input method editor is employed, the appropriate data must be extracted from the Windows NT input method editor internal data storage.

Table IV illustrates how data is entered into IString class 202 by data entry methods 210 for logosyllabic languages, such as Japanese, which employ neither the latin character set nor a character set which may be sound-mapped to the latin character set.

TABLE IV

| Field | Type | Data |
| --- | --- | --- |
| baseString | Java String | <Kanji> |
| sortString | Java String | はやし |
| altString | Java String | hayashi |
| sourceLocale | Java String | JP |
| sourceLanguage | Java String | ja |
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 208 is the latin characters typed by the user to compose the desired ideograph. The data entered into sortString 206 are the syllabary characters phonetically spelling the desired ideograph, providing an intermediate representation of the ideograph. The data entered into baseString 204 is the final ideograph selected by the user. As with transliteration of non-latin characters as described above, non-latin characters may be entered into altString 208 if the targetLanguage property is set to a language other than English and IME 224 supports composition of the ideographs by phonetic spelling in a language other than English. For instance, an IString object 202 might contain Japanese Kanji in baseString 204, hiragana in sortString 206, and Cyrillic characters in altString 208 if IME 224 permits composition of Japanese Kanji characters by phonetic spelling in Russian.

A suitable constructor for receiving baseString 204, sortString 206 and altString 208 from IME 224 via data entry methods 210 for entry into an IString object 202 may be:

```
/**********************************************
 ******
 *
 * <P> </P>
 *
 * <dt> <b> Description: </b> <dd>
 * <p> Allocate a new IString. The baseString, sort-
     String and
 * altString are entered from the IME utilizing the
     default language and
 * locale. </p>
 *
 **********************************************
 *******/
public IString(String base,
    String sort,
    String alt,
    Locale src,
    Locale tgt) {
this.baseString=base;
this.sortString=sort;
this.altString=alt;
this.sourceLocale=src.getLocale( );
this.sourceLanguage=src.getLanguage( );
this.targetLocale=tgt.getLocale( );
this.targetLanguage=tgt.getLanguage( );
init( );
}
```

The contents of baseString 204, sortString 206 and altString 208 are entered into the respective fields from data derived from IME 224, while the contents of sourceLocale 212 and sourceLanguage 214 are entered from the default locale and language properties specified by the host system in which data is being entered into IString object 202. The contents of targetLocale 216 and targetLanguage 218 will typically be a locale/language code for a language utilizing the latin character set such as "en_US" (English—United States).

Regardless of the language in which text is entered into an IString class object 202, the data automatically entered into each of the baseString 204, altString 206, and sortString 208 by data entry methods 210 may be overridden or altered using other methods. The fields of an IString object 202 may preferably be individually and independently edited, allowing artificial promotion within sortString field 206 as described above, replacement of an erroneously selected ideograph in baseString field 204, or correction of a phonetic spelling within altString field 208.

While the above-described methods assumed that the source and target languages were taken from host system defaults, data may alternatively be entered into baseString 204, sortString 206 and altString 208 for specified source and target languages utilizing the constructor:

```
/**********************************************
 *******
 *
 * <P> </P>
 *
 * <dt> <b> Description: </b> <dd>
 * <p>Allocate a new IString. The baseString, sortString
     and
 * altString are entered from the IME for specified target
     and source
 * language and locale. </p>
 *
 **********************************************
 *******/
public IString(String base,
    String sort,
    String alt,
    String srcLanguage,
```

```
    String srcLocale,
    String tgtLanguage,
    String tgtLocale) {
  this.baseString=base;
  this.sortString=sort;
  this.altString=alt;
  this.sourceLocale=srcLocale;
  this.sourceLanguage=srcLanguage;
  this.targetLocale=tgtLocale;
  this.targetLanguage=tgtLanguage;
  init( );
}
```

In this constructor, the source and target language and locale which are employed to select the characters entered into baseString 204, sortString 206 and altString 208 may be specified. This latter constructor may be employed to create an IString object 202 in other than the host system default language, or in host systems where data for the IString object 202 is received from another system and a local instance is created.

It should be noted that transliteration engine 220 and messaging methods 226 need not necessarily be implemented within an IString class 202 as depicted in FIG. 2, and that IME method 224 need not be implemented separately. Transliteration engine 220 and messaging methods 226 may instead be implemented within separate subclasses which are appropriately constructed and/or invoked by IString class 202 as necessary, while IME 224 may be implemented as a method within IString class 202.

Transliteration engine 220 and IME 224 and are only required by data entry methods 210 to gather input data for IString class 202 objects under certain locale and language property settings. Otherwise, data may be programmatically input into baseString 204, sortString 206, and altString 208 by invoking the proper constructor. The methods which may be invoked by programs at runtime to programmatically get and set fields within IString 202 include:

```
/***********************************************
 *****
 *
 * <P> </P>
 *
 * <dt> <b> Description: </b> <dd>
 * <p> Get the IString baseString. </p>
 *
 * @returns str String containing the base string
 *
 ***********************************************
 *******/
public String getBaseString( ) {
  return this.baseString;
}
```

This method returns the contents for baseString 204 for an IString object 202. Similar methods return the contents of sortString 206 and altString 208:

```
/***********************************************
 ******
 *
 * <P> </P>
 *
 * <dt> <b> Description: </b> <dd>
 * <p> Get the IString sortString. </p>
 *
 * @returns str String containing the sort string
 *
 ***********************************************
 *******
```

```
public String getSortString( ) {
  return this.sortString;
}
/***********************************************
 ******
 *
 * <P> </P>
 *
 * <dt> <b> Description: </b> <dd>
 * <p> Get the IString altString. </p>
 *
 * @returns str String containing the alt string
 *
 ***********************************************
 ********
public String getAltString( ) {
  return this.altString;
}
```

The methods also include setting baseString 204:

```
/***********************************************
 ******
 *
 * <P> </P>
 *
 * <dt> <b> Description: </b> <dd>
 * <p> Set the IString baseString. <lp>
 *
 * @param str String containing the base string
 *
 ***********************************************
 *******
public void setBaseString(String sBase) {
  this.baseString=sBase;
}
``` as well as sortString 206 and altString 208:

```
/***********************************************
 ******
 *
 * <P> </P>
 *
 * <dt> <b> Description: </b> <dd>
 * <p> Set the IString sortString. </p>
 *
 * @param str String containing the sort string
 *
 ***********************************************
 *******
public void setSortString(String sSrt) {
  this.sortString=sSrt;
}
/***********************************************
 ******
 *
 * <P> </P>
 *
 * <dt> <b> Description: </b> <dd>
 * <p> Set the IString altString. </p>
 *
 * @param str String containing the alt string
 *
 ***********************************************
 *******
public void setAltString(String sAlt) {
  this.altString=sAlt;
}
```

In addition to getting and setting baseString 204, sortString 206, and altString 208 for an IString object 202, programs may need to get or set the display locale or language of an IString object 202. Accordingly, other methods are provided to permit a program to get and/or set the locale or language properties of IString data:

```
/***********************************************
 ******
 *
 * <P> </P>
 *
 * <dt> <b> Description: </b> <dd>
 * <p> Get the locale of the IString data. </p>
 *
 * @returns loc Locale containing the locale of the data
 *
 ***********************************************
 *******
 public Locale getLocale( ) {
    Locale loc=new Locale(this.sourceLanguage,
       this.sourceLocale);
    return loc;
 }
/***********************************************
 *****
 * <P> </P>
 * <dt> <b> Description: </b> <dd>
 * <p> Set the locale of the IString data. </p>
 *
 * @param loc Locale of the data
 *
 ***********************************************
 *******
 * public void setLocale(Locale loc) {
    this.sourceLocale=loc.getLocale( );
    this.sourceLanguage=loc.getLanguage( );
 }
/***********************************************
 ******
 *
 * P> </P
 *
 * <dt> <b> Description: </b> <dd>
 * <p> Get the display language of the IString data. <lp>
 *
 * @returns Display language of the data
 *
 ***********************************************
 *******
 public String getDisplayLanguage( ) {
    Locale loc=new Locale(this.sourceLanguage,
       this.sourceLocale);
    return loc.getDisplayLanguage( );
 }
/***********************************************
 ******
 *
 * <P> </P>
 *
 * <dt> <b> Description: </b> <dd>
 * <p> Get the display locale of the IString data. </p>
 *
 * @returns Display locale of the data
 ***********************************************
 *******
 public String getDisplayLocale( ) {
    if(this.sourceLanguage==
    null&&this.sourceLocale==null)
    return null;
    else {
       Locale loc=new Localelthis.sourceLanguage,
          this.sourceLocale);
       return loc.getDisplayLocale( );
    }
 }
```

While these methods are available, IString class 202 preferably exhibits a "black box" behavior such that the programmer/user need not know anything about the methods implemented for IString class 202. IString class 202 simply appears as a data type which encapsulates extra information about baseString 204 and also includes some methods for transforming characters from one character set to another. For special cases where the sortString field 206 or altString field 208 are to be exposed to the user in addition to or in lieu of baseString 204, either for editing or for display only, a separate set of controls may be provided.

In the present invention, IString class 202 is employed to effectively transfer human language data across systems employing incongruous languages. The contents of baseString 204 provide a native representation of the text in the default language of the system originating the IString object 202. However, for each system participating in the exchange of data with other systems running in different human languages, the targetLocale property 216 and targetLanguage 218 property of an IString object 202 are preferably set to a common value (e.g., targetLocale="US", targetLanguage="en"). The contents of altString 208 will thus contain a common, cross-language representation of the text string. In systems where the default language of a system receiving an object differs from the language of the contents of baseString 204, IString class object 202 may automatically switch to presenting the contents of altString 208 as the text string to be displayed or processed.

Figure 3:
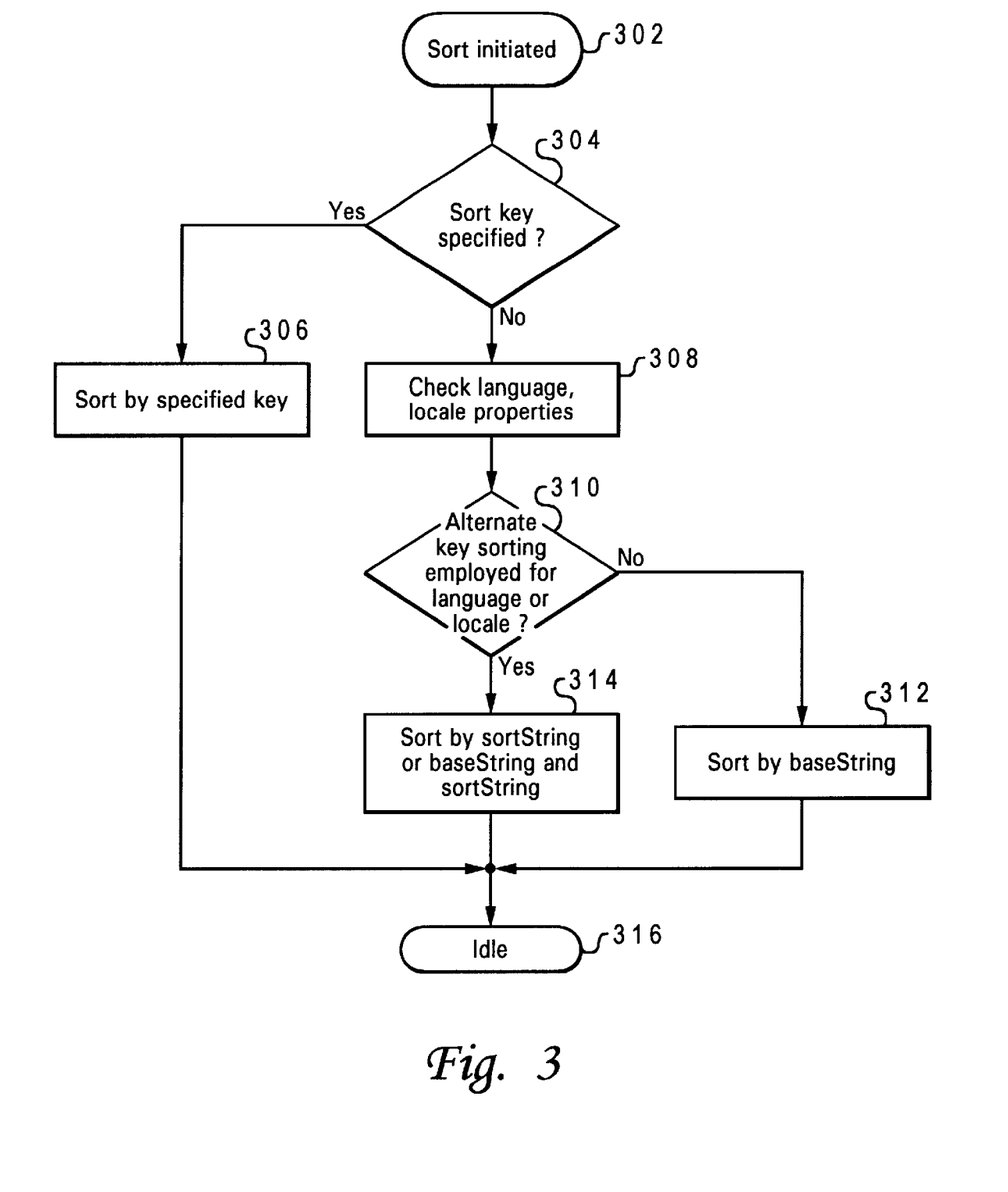
FIG. 3 depicts a high level flowchart for a process also of employing a multi-field text string class to sort text strings in accordance with a preferred embodiment of the present invention.

Referring to FIG. 3, a high level flowchart for a process of employing a multi-field text string class to sort text strings in accordance with a preferred embodiment of the present invention is illustrated. FIG. 3 is intended to be read in conjunction with FIG. 2. Normally text strings are sorted alphanumerically by the text contained within each respective string. With the three-field text class 202 of the present invention, objects may be artificially promoted by inserting extra, low-sort-value characters before the text in the sortString field 206 (e.g., "AAA_Frank Moss") without those additional characters appearing in the display when the default baseString field 204 is displayed.

The three-field text class 202 of the present invention also provides another avenue for supporting alternative sort orders for different cultures. A group of IString objects 202 may be sorted by the Unicode value in the baseString field 204. However, since ideographs having multiple meanings and/or pronunciations may not be sorted in a culturally correct order without knowledge of the associated pronunciation, sorting IString objects 202 may be based on the Unicode characters within the sortString field 306.

While the Unicode character stored in the baseString field 204 of an IString class object 202 may provide no information as to the correct pronunciation, the characters within the sortString field 206 will provide culturally correct sort order information for the IString class object 202. IString objects, therefore, may be sorted by employing the altString field 306 as the sort key rather than the baseString field 304. This allows, for example, Japanese to be sorted in a culturally correct order despite the Unicode ordering of the Kanji character set and despite the fact that a particular ideographic symbol may have several different pronunciations and/or meanings.

Since the hiragana or katakana representation of the word is captured by IME 224 in the sortString field 206, IString objects 202 may be sorted by sortString 206, or first sorted by baseString 204 and, for subgroups of multiple objects having identical characters in the baseString field 204, by altString 206 within such subgroups. The former approach would be preferable for Japanese, since the Unicode ordering is culturally incorrect. The latter approach may be preferable in other circumstances.

A high level flowchart for a process of sorting three-field text class objects in accordance with the present invention is illustrated in FIG. 3. The process begins at step 302, which depicts a sort of IString class objects being initiated. The process then passes to step 304, which illustrates a determination of whether a sort key (baseString 204, sortString 206, or altString 208) has been specified. If so, the process proceeds to step 306, which depicts sorting the subject IString objects utilizing the specified sort key. The process then passes to step 316, which illustrates the process becoming idle until another sort of IString objects is initiated.

Referring again to step 304, if no sort key is specified, the process proceeds instead to step 308, which depicts checking the language and locale properties of the system in which the sorting is being performed. The process next passes to step 310, which illustrates a determination of whether alternate key sorting is employed for the language or locale specified. If so, the process proceeds to step 312, which depicts sorting the subject IString class objects by the default sort key for languages or locales which do not employ an alternate sort key, which is baseString 204 in the exemplary embodiment. The process then passes to step 316.

If the language or locale specified by the language and locale properties employ an alternate sort key, the process proceeds from step 310 to step 314, which illustrates sorting the subject IString class objects utilizing the alternate sort key, which would typically be sortString 206. Alternatively, the sorting mechanism may sort first by a default sort key, such as baseString 204, and then perform a secondary sort within objects having the same contents within baseString 204 by the alternate sort key, such as sortString 206. The process then passes to step 316.

It should be noted that employing sortString 206 for sorting purposes does not require the subject IString objects to be displayed utilizing sortString 206. The objects may be sorted utilizing the contents of one field, but represented in the display by the contents of a different field. When integrated with the language and locale properties, this permits IString objects containing strings in languages such as Japanese to be automatically sorted in a culturally correct order, despite the order of the Unicode characters. This also permits artificially promoted IString objects to be displayed without displaying the mechanism by which the sort order was changed.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of sorting text strings, comprising:

for each of a plurality of text strings, storing a first set of characters representing a corresponding text string in a first field within a multi-field data packet and a second set of characters representing the corresponding text string in a second field within the multi-field data packet, wherein each multi-field data packet for a text string includes a plurality of fields each containing a different representation of the text string;

sorting the plurality of text strings utilizing characters within the second field for each text string; and displaying the plurality of text strings in a sorted order utilizing the characters within the first field for each text string.

2. The method of claim 1, wherein the step of storing a first set of characters representing a corresponding text string in a first field within a multi-field data packet and a second set of characters representing the corresponding text string in a second field within the multi-field data packet further comprises:

storing an ideograph within the first field; and storing a syllabary spelling of the ideograph within the second field.

3. The method of claim 2, further comprising:

automatically capturing the syllabary spelling of the ideograph for entry in the second field during phonetic entry by a user of the ideograph for entry in the first field.

4. The method of claim 1, wherein the step of storing a first set of characters representing a corresponding text string in a first field within a multi-field data packet and a second set of characters representing the corresponding text string in a second field within the multi-field data packet further comprises:

storing a character string within the first field; and storing a user-defined sort value for the character string within the second field.

5. The method of claim 4, wherein the step of storing a user-defined sort value for the character string within the second field further comprises:

storing the character string prefixed with at least one low sort-order character within the second field.

6. The method of claim 1, wherein the step of sorting the plurality of text strings utilizing characters within the second field for each text string further comprises:

sorting the plurality of text strings utilizing only characters within the second field as a sort key.

7. The method of claim 1, wherein the step of sorting the plurality of text strings utilizing characters within the second field for each text string further comprises:

sorting the plurality of text strings utilizing characters within the first field as a first-order sort key; and for text strings containing the same characters within the first field, sorting the plurality of text strings utilizing characters within the second field as a second-order sort key.

8. The method of claim 1, wherein the step of displaying the plurality of text strings in a sorted order utilizing the characters within the first field for each text string further comprises:

displaying ideographs within the first field of each of the plurality of text strings in an order sorted by syllabary spellings of the corresponding ideographs.

9. A system for sorting text strings, comprising:

means, for each of a plurality of text strings, for storing a first set of characters representing a corresponding text string in a first field within a multi-field data packet and a second set of characters representing the corresponding text string in a second field within the multi-field data packet, wherein each multi-field data packet for a text string includes a plurality of fields each containing a different representation of the text string;

means for sorting the plurality of text strings utilizing characters within the second field for each text string; and means for displaying the plurality of text strings in a sorted order utilizing the characters within the first field for each text string.

10. The system of claim 9, wherein the means for storing a first set of characters representing a corresponding text string in a first field within a multi-field data packet and a second set of characters representing the corresponding text string in a second field within the multi-field data packet further comprises:

means for storing an ideograph within the first field; and means for storing a syllabary spelling of the ideograph within the second field.

11. The system of claim 10, further comprising:

means for automatically capturing the syllabary spelling of the ideograph for entry in the second field during phonetic entry by a user of the ideograph for entry in the first field.

12. The system of claim 9, wherein the means for storing a first set of characters representing a corresponding text string in a first field within a multi-field data packet and a second set of characters representing the corresponding text string in a second field within the multi-field data packet further comprises:

means for storing a character string within the first field; and means for storing a user-defined sort value for the character string within the second field.

13. The system of claim 12, wherein the means for storing a user-defined sort value for the character string within the second field further comprises:

means for storing the character string prefixed with at least one low sort-order character within the second field.

14. The system of claim 9, wherein the means for sorting the plurality of text strings utilizing characters within the second field for each text string further comprises:

means for sorting the plurality of text strings utilizing only characters within the second field as a sort key.

15. The system of claim 9, wherein the means for sorting the plurality of text strings utilizing characters within the second field for each text string further comprises:

means for sorting the plurality of text strings utilizing characters within the first field as a first-order sort key; and means, for text strings containing the same characters within the first field, for sorting the plurality of text strings utilizing characters within the second field as a second-order sort key.

16. The system of claim 9, wherein the means for displaying the plurality of text strings in a sorted order utilizing the characters within the first field for each text string further comprises:

means for displaying ideographs within the first field of each of the plurality of text strings in an order sorted by syllabary spellings of the corresponding ideographs.

17. A computer program product within a computer usable medium for sorting text strings, comprising:

instructions, for each of a plurality of text strings, for storing a first set of characters representing a corresponding text string in a first field within a multi-field data packet and a second set of characters representing the corresponding text string in a second field within the multi-field data packet, wherein each multi-field data packet for a text string includes a plurality of fields each containing a different representation of the text string;

instructions for sorting the plurality of text strings utilizing characters within the second field for each text string; and instructions for displaying the plurality of text strings in a sorted order utilizing the characters within the first field for each text string.

18. The computer program product of claim 17, wherein the instructions for storing a first set of characters representing a corresponding text string in a first field within a multi-field data packet and a second set of characters representing the corresponding text string in a second field within the multi-field data packet further comprises:

instructions for storing an ideograph within the first field; and instructions for storing a syllabary spelling of the ideograph within the second field.

19. The computer program product of claim 18, further comprising:

instructions for automatically capturing the syllabary spelling of the ideograph for entry in the second field during phonetic entry by a user of the ideograph for entry in the first field.

20. The computer program product of claim 17, wherein the instructions for storing a first set of characters representing a corresponding text string in a first field within a multi-field data packet and a second set of characters representing the corresponding text string in a second field within the multi-field data packet further comprises:

instructions for storing a character string within the first field; and instructions for storing a user-defined sort value for the character string within the second field.

21. The computer program product of claim 20, wherein the instructions for storing a user-defined sort value for the character string within the second field further comprises:

instructions for storing the character string prefixed with at least one low sort-order character within the second field.

22. The computer program product of claim 17, wherein the instructions for sorting the plurality of text strings utilizing characters within the second field for each text string further comprises:

instructions for sorting the plurality of text strings utilizing only characters within the second field as a sort key.

23. The computer program product of claim 17, wherein the instructions for sorting the plurality of text strings utilizing characters within the second field for each text string further comprises:

instructions for sorting the plurality of text strings utilizing characters within the first field as a first-order sort key; and instructions, for text strings containing the same characters within the first field, for sorting the plurality of text strings utilizing characters within the second field as a second-order sort key.

24. The computer program product of claim 17, wherein the instructions for displaying the plurality of text strings in a sorted order utilizing the characters within the first field for each text string further comprises:

instructions for displaying ideographs within the first field of each of the plurality of text strings in an order sorted by syllabary spellings of the corresponding ideographs.

\* \* \* \* \*